WILLIAM A. JONES.
Oyster Steamer.
No. 124,494.  Patented March 12, 1872.
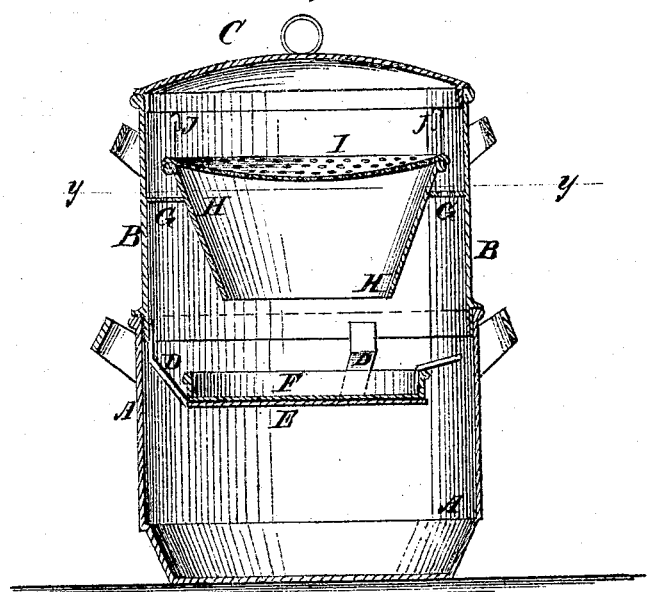
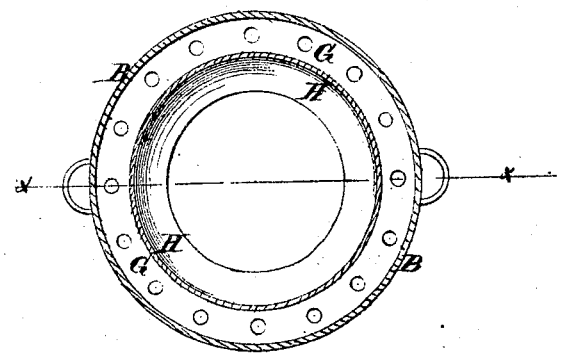

UNITED STATES PATENT OFFICE.

WILLIAM A. JONES, OF ERIE, PENNSYLVANIA.

IMPROVEMENT IN OYSTER-STEAMERS.

Specification forming part of Letters Patent No. 124,494, dated March 12, 1872.

Specification describing a new and useful Improvement in Oyster-Steamers, invented by WILLIAM A. JONES, of Erie, in the county of Erie and State of Pennsylvania.

Figure 1 is a detail vertical section of my improved steamer taken through the line $x$ $x$, Fig. 2. Fig. 2 is a detail horizontal section of the same taken through the line $y$ $y$, Fig. 1.

Similar letters of reference indicate corresponding parts.

My invention has for its object to furnish an improved steamer for steaming oysters which shall be simple in construction, convenient in use, and effective in operation, enabling the juice from the oysters to be preserved, so that it may be put back upon them when served; and it consists in the construction and combination of the various parts of the steamer, as hereinafter more fully described.

A is the lower part of the steamer, which is designed to be set upon a stove, furnace, or other heater, which is designed to receive the water for generating the steam, and which may be an ordinary boiler or vessel, or a vessel made expressly for the purpose. B is the upper part of the steamer, the lower end of which is so formed as to fit into the mouth of the lower part A and rest upon its upper edge, as shown in Fig. 1. The part B is made open at bottom and top, and is provided with a close-fitting cover, C, as shown in Fig. 1. To the lower edge of the part B are attached arms D, (three or more,) which project downward and inward, and to the lower ends of which is attached a disk, E, which is thus of a less diameter than the parts A B, to allow the steam to pass up freely around its edge. The disk E is designed to serve as a support to a dish, F, placed upon it to receive and preserve the juice from the oysters, as hereinafter more fully described. The disk E also serves as a stand for the part B and its attachments when removed from the part A. G is a perforated plate, the edges of which are attached to the sides of the part B near its top. The middle part of the perforated plate or rack G is cut away to receive the funnel-shaped band H, which is placed in the opening in the plate G, and may be secured to said plate. The band H is designed to receive and support the perforated plate I that receives the oysters to be steamed. The funnel-shaped band H is also designed to conduct the juice from the oysters to the dish F and preserve it, so that it may be poured back upon the oysters when served. The perforated plate I should be provided with a handle or handles, J, for convenience in placing it upon and removing it from the band H. The parts A B C may be made large, so as to contain any desired number of sets of the attachments for use in hotels, saloons, &c., where several dishes of steamed oysters may be wanted at a time.

Having thus described my invention, I claim as new and desire to secure by Letters Patent—

1. The combination of the perforated ring-plate G and funnel-shaped band H with the upper part B of a steamer, A B, substantially as herein shown and described, and for the purposes set forth.

2. The combination of the disk E and arms D with the upper part A of a steamer, A B, substantially as herein shown and described, and for the purposes set forth.

3. An improved oyster-steamer, formed by the combination of the lower part A, upper part B, cover C, arms D, disk E, dish F, perforated ring-plate G, funnel-shaped band H, and perforated plate I with each other, substantially as herein shown and described, and for the purposes set forth.

WILLIAM A. JONES.

Witnesses:
HENRY MAYER,
JNO. F. FIRCH.